United States Patent [19]

Putt

[11] 4,121,139
[45] Oct. 17, 1978

[54] MAGNETIC APPARATUS FOR PRODUCING MOVEMENT

[76] Inventor: J. William Putt, 3278 W. Cedar St., Allentown, Pa. 18104

[21] Appl. No.: 758,227

[22] Filed: Jan. 10, 1977

Related U.S. Application Data

[63] Continuation-in-part of Ser. No. 634,568, Nov. 24, 1975, abandoned.

[51] Int. Cl.² .......................................... H02K 33/16
[52] U.S. Cl. .................................. 318/134; 417/417; 310/34; 310/35; 335/268
[58] Field of Search ........................ 310/15, 30, 34, 35; 417/417; 335/259, 267, 268; 318/120, 121, 134

[56] References Cited

U.S. PATENT DOCUMENTS

| 1,341,657 | 6/1920 | Miller | 318/134 X |
| 3,488,614 | 1/1970 | Macy | 335/267 X |
| 3,606,595 | 9/1971 | Tokamizawa | 310/30 X |
| 3,878,412 | 4/1975 | Kurpanek | 310/34 X |
| 4,012,675 | 3/1977 | Schulze, Jr. | 318/134 X |

Primary Examiner—Donovan F. Duggan
Attorney, Agent, or Firm—Beveridge, DeGrandi, Kline & Lunsford

[57] ABSTRACT

A plurality of aligned magnets are movable with respect to each other and their polarities are changed to cause changing of the distances between adjacent magnets by opening and closing of air gaps therebetween. Driven magnets travel a distance which is greater than the air gap between any two adjacent magnets.

15 Claims, 24 Drawing Figures

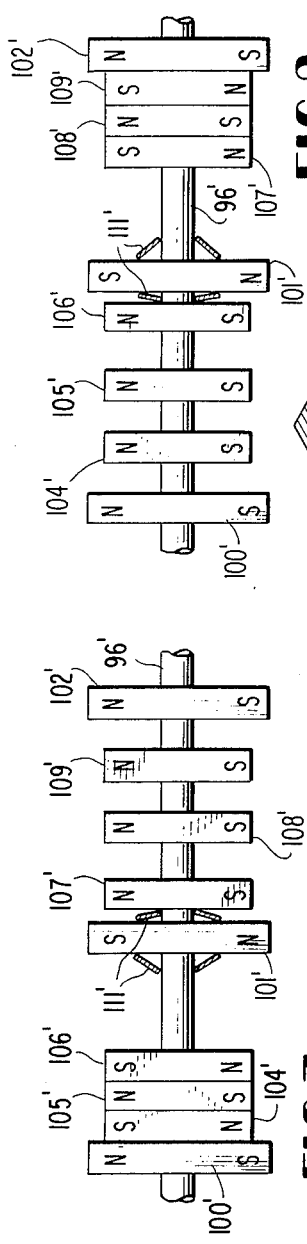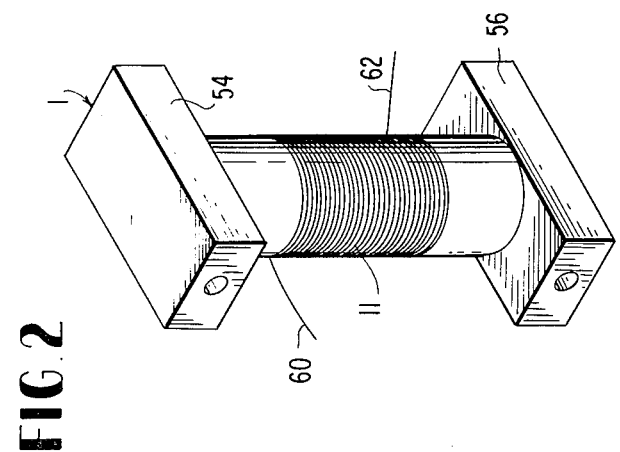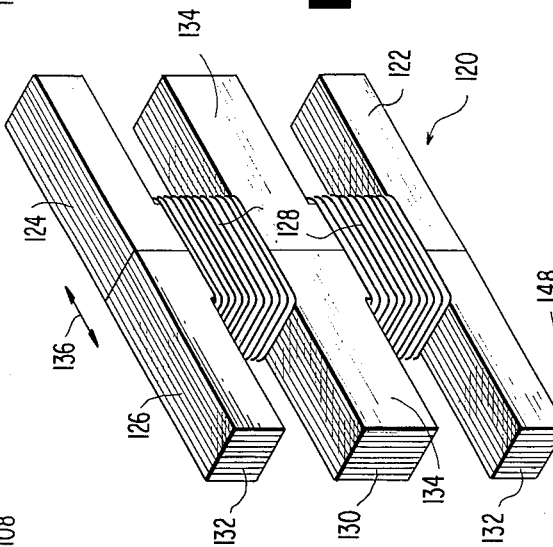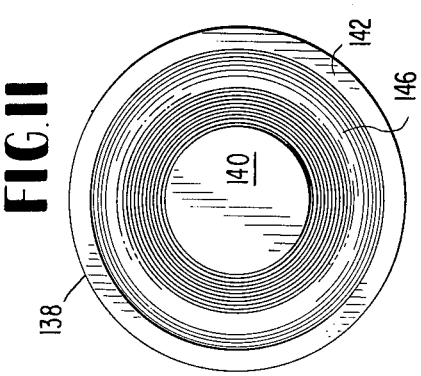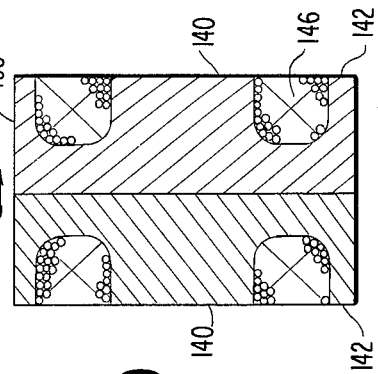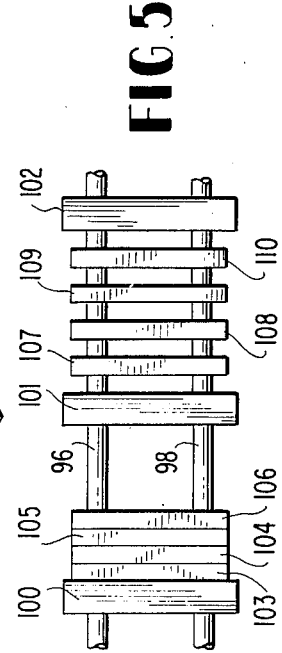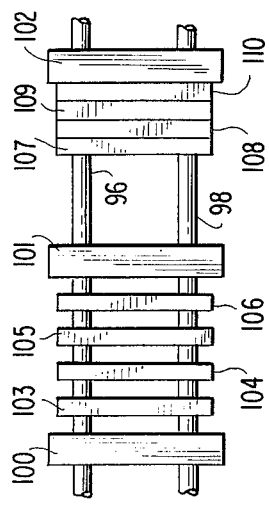

MAGNETIC APPARATUS FOR PRODUCING MOVEMENT

This is a continuation in part of application Ser. No. 634,568 filed Nov. 24, 1975, now abandoned.

BACKGROUND AND SUMMARY OF THE INVENTION

This invention relates to a magnetic actuator for producing mechanical movement in a pump or other output means.

Heretofore, there have been a number of magnetic actuators which operate on the basic principle of changing the polarity of a magnet. Typical examples of this are found in U.S. Pat. Nos. 2,198,506; 2,568,757; 3,320,894; 3,384,021; 3,488,614; 3,492,819; 3,606,595 and 3,878,412.

It is a known practice to change the polarity of a magnet in order to produce reciprocating movement. This is done by placing a movable magnet between two stationary magnets and changing the polarities of the magnets so that the movable magnet travels first toward one stationary magnet and then toward the other stationary magnet in a shuttle-like fashion. Such an arrangement imposes constraints on the distance which may be traveled by the driven magnet, inasmuch as the air gap between it and the stationary magnets must be minimized in order to deliver a useful amount of force to the output means.

According to this invention, a plurality of magnets are arranged along an axis so that there are air gaps between the adjacent magnets. Means are provided for changing the polarity of one of each adjacent pair of magnets to move adjacent magnets between mutually proximate relative positions where the air gap therebetween is substantially closed and mutually distant relative positions where the air gap is open. With such an arrangement, some of the magnets will move through a distance which is greater than the thickness of an air gap, thus producing a maximum stroke while at the same time delivering a useful amount of force to the output means. In accomplishing this purpose, stop means are preferably provided to limit the extent of movement of magnets away from each other when they are in their repelling polarity conditions.

For a more complete understanding of the invention, reference is made to the following description and to the accompanying drawings.

BRIEF DESCRIPTION OF THE DRAWINGS

FIG. 2 is a perspective view of one of the magnets used in the system of FIG. 1.

FIGS. 3a-3i are diagramatic representations showing the changes in polarity of the magnets of the system of FIG. 1 and the movement which is produced by these changes in polarity.

FIGS. 5 and 6 show an embodiment of the invention which has dual sets of magnets.

FIGS. 7 and 8 show another embodiment of the invention with two sets of magnets.

FIG. 9 shows a preferred magnet configuration for use in connection with the invention.

FIGS. 10 and 11 are sectional and facial views of another magnet configuration operable with the invention.

BRIEF DESCRIPTION OF AN EMBODIMENT OF THE INVENTION

Figure 1:
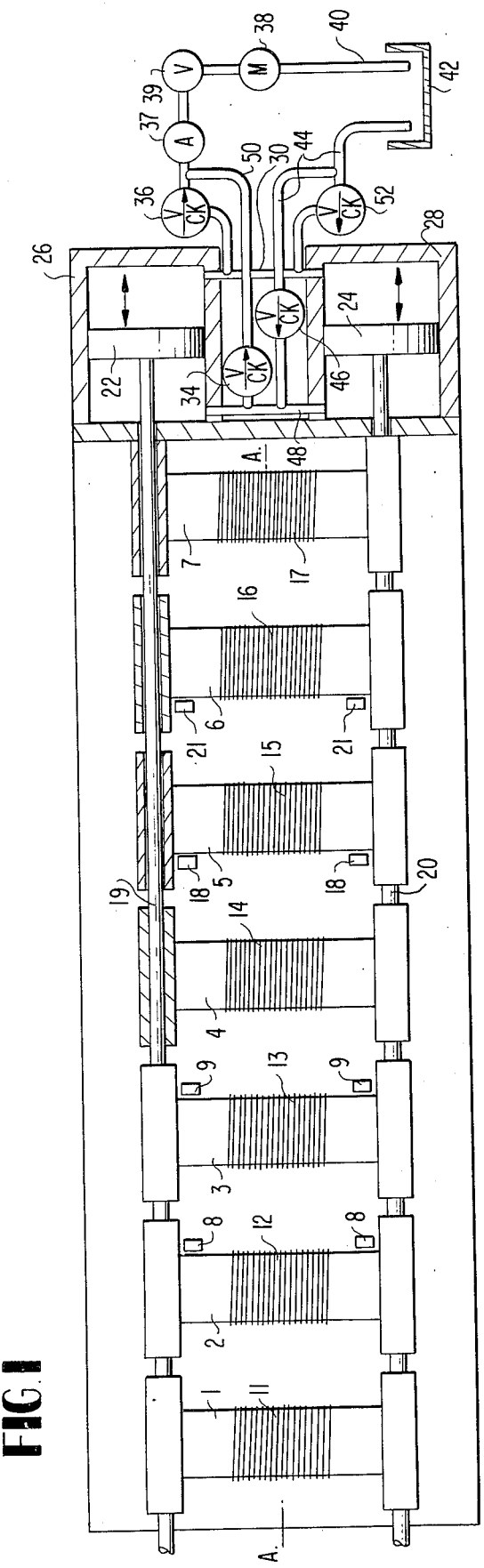
FIG. 1 is a diagramatic view, partially in section, of an apparatus constructed according to the invention, utilizing seven aligned magnets and an hyraulic pump and motor system as the output means.

In FIG. 1, it will be seen that a set of magnets 1-7 is enclosed within a housing 10 of plastic or other nonmagnetic material with the magnets 1 and 7 being stationary with respect to the housing and the magnets 2-6 being supported for reciprocating movement in the direction of the axis A—A of the device. The magnets are electromagnets provided with windings schematically illustrated at 11-17, and the direction of current flow through windings 11, 13, 15 and 17 is changed in order to cause sequential opening and closing of the air gaps between adjacent magnets. The central magnet 4 is connected by nonmagnetic rods 19 and 20 to pistons 22 and 24 which are reciprocably mounted in associated cylinders schematically illustrated at 26 and 28. The magnets 2, 3, 5 and 6 are longitudinally movable on the rods 19 and 20 which serve to guide the motion of these magnets. Movement of the driven magnet 4 to the right will drive pistons 22 and 24 to the right, driving fluid from cylinders 26 and 28 into manifold line 30, check valve 36, pulsation-damping accumulator 37, motor control valve 39, and to the hydraulic motor 38. An exhaust line 40 delivers hydraulic fluid from the motor 38 into the reservoir 42. As the pistons 22 and 24 are moving to the right, hydraulic fluid enters the left ends of the cylinders by passing through the return line 44 and the check valve 46 to the manifold line 48 connected to the left end of the cylinders. Of course as the pistons 22 and 24 move to the left, pressurized hydraulic fluid is delivered to the motor 38 from the manifold line 48, check valve 34 and delivery line 50. At this time, hydraulic fluid also flows into the right side of the cylinders 26 and 28 from the sump 42 via check valve 52 and line 30.

The magnets 1-7 are similarly constructed, with the magnet 1 being shown in FIG. 2. The magnet is formed of pole pieces 54 and 56 which are connected together by a bridge piece 58. Preferably, the poles 54 and 56 and the bridge piece 58 are of laminated construction, well-known in the technology of magnets to optimize their forces of attraction and repulsion. The windings of the magnet are placed around the bridge piece 58 so that the pole pieces 54 and 56 will have opposite polarities with respect to each other. Leads 60 and 62 are connected to an electrical energizing system, the details of which are discussed later in this specification.

Referring back to FIG. 1, it will be noted that all of the magnets are separated by equal air gaps, and that the total stroke of the pistons 22 and 24 will be equal to the total distance of those air gaps. When the apparatus is in the position of FIG. 1, the central or driven magnet 4 will be moving either to the left or to the right. If moving toward the right, the air gap between the magnets 4 and 5 will be closing; and, if moving toward the left, the air gap between magnets 3 and 4 will be closing. The movement of intermediate magnets 2 and 3 to the right is limited by stationary stops 8 and 9; and the movement of the intermediate magnets 5 and 6 to the left is limited by corresponding stationary stops 18 and 21. The purpose of the stops 8, 9, 18 and 21 is to establish a maximum air gap between adjacent magnets by limiting the extent of movement of the magnets away from each other.

Figures 3A, 3B, 3C, 3D, 3E, 3F, 3G, 3H, 3I:
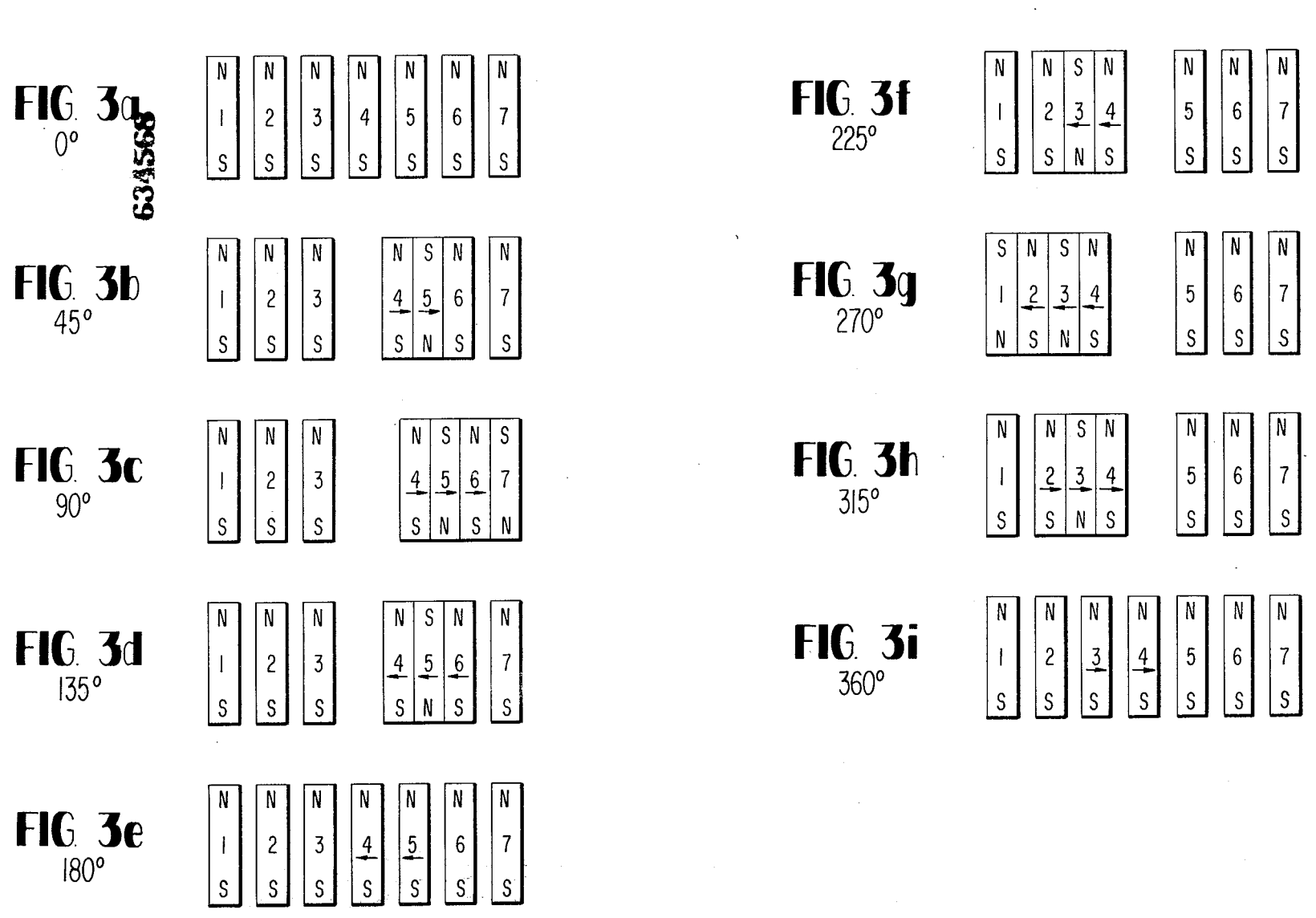

An appropriate sequence of operation is illustrated diagramatically in FIGS. 3a–3i. FIG. 3a shows the magnets in the position shown in FIG. 1, all magnets having the same polarity so that they are all repelling each other in order to maintain the air gap. This is a momentary condition, inasmuch as the polarity of magnet 5 is changed immediately to attract the magnets 4, 5 and 6 together toward the position illustrated in FIG. 3b wherein the arrows indicate the movement which has brought the magnets to the illustrated position. At this point, the polarity of the stationary end magnet 7 is changed, thus closing the air gap between magnets 6 and 7 and moving the driven magnet 4 to its rightmost position. The polarity of the end magnet 7 is then changed to repel magnet 6 and drive magnet 4 to the left as illustrated in FIG. 3d. Subsequently, the driven magnet 4 is restored to its central position shown in FIG. 3e by changing the polarity of magnet 5 to open both the air gap between magnets 4 and 5 and the air gap between magnets 5 and 6. When this is achieved, the polarity of magnet 3 is changed. This is illustrated in FIG. 3f where it will be seen that both magnets 3 and 4 have been moved to the left. The polarity of magnet 1 is then changed so that all the magnets 1–4 are attracting each other and the driven magnet 4 is brought to its leftmost position. Of course, this will bring the pistons 22 and 24 in FIG. 1 to their furthest left position. Immediately after arriving at this position, the polarity of magnet 1 is changed, thus repelling magnets 2, 3 and 4 to the right as illustrated in FIG. 3h. Thereafter, the polarity of magnet 3 is changed so that all magnets are in their repelling conditions and the assembly is again returned to the position shown in FIG. 3a. In the course of operations, the central magnet 4 has moved through a distance which is equal to the total changes in the air gaps between the magnets in the assembly.

Figure 4:
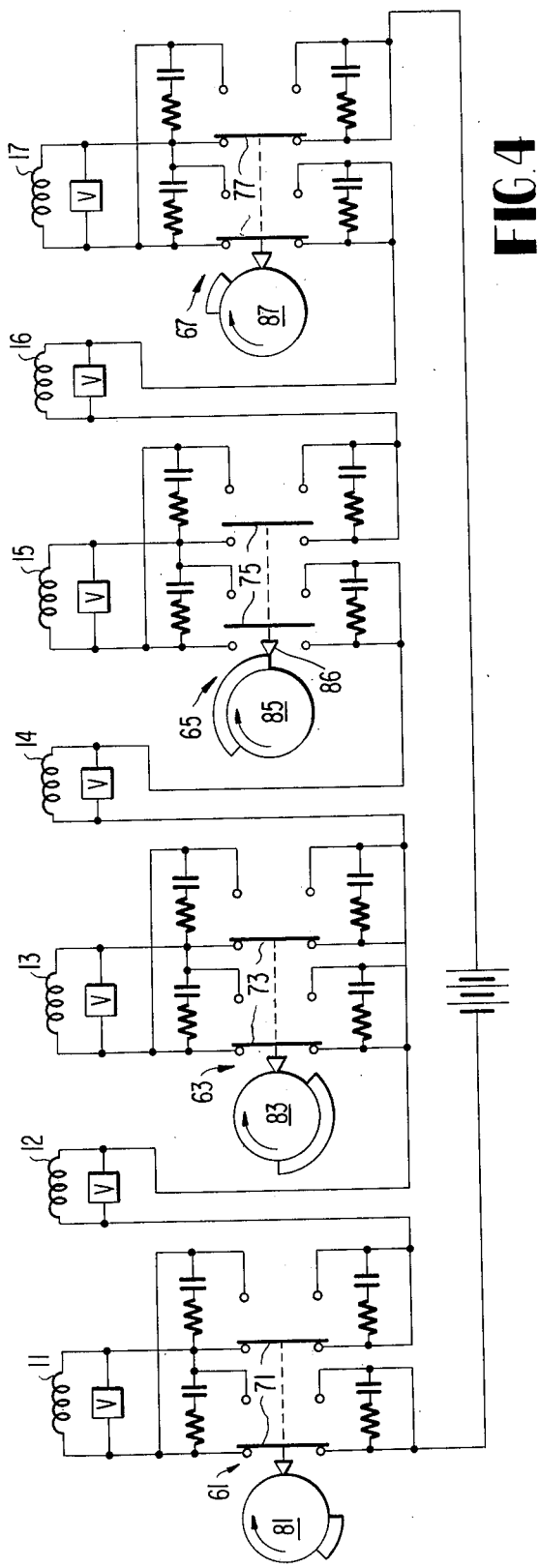
FIG. 4 is a schematic wiring diagram which illustrates a suitable means for changing the polarities of the magnets in the system of FIG. 1.

A suitable means for changing the polarity of the electromagnets is the circuit illustrated in FIG. 4 where the winding 11–17 for the respective electromagnets are shown diagramatically. The windings are connected in series, and all have the same number of turns in order to provide precisely the same number of ampere-turns throughout the apparatus. The same result may be realized by arranging the windings in parallel. In order to achieve the changes in polarity required of the magnets 1, 3, 5 and 7, their respective windings 11, 13, 15 and 17 are connected into the system by reversing switches which are respectively designated 61, 63, 65 and 67. These reversing switches are normally maintained in their leftmost position as illustrated in FIG. 4 so that current will flow through the windings in the same direction that it flows through the windings 12, 14 and 16 for the magnets 2, 4 and 6 which do not change their polarity. This is achieved by biasing the movable contact pairs 71, 73, 75 and 77 toward the left. Electrical arcing at the contacts of the switches 61, 63, 65 and 67 is reduced by the provision of conventional R-C circuits as shown. Varistors V prevent excessive electrical surges through the windings 11–17.

The polarity of the magnets 1, 3, 5 and 7 is reversed by shifting the movable contact pairs 71, 73, 75 and 77 to the right. This movement is produced by rotary cams 81, 83, 85 and 87 which are connected together on a common shaft. One revolution of the shaft corresponds to a complete cycle of system operation as illustrated in FIGS. 3a–i. Assuming the cams are at their zero position when the apparatus is as shown in FIGS. 1 and 3a, the first polarity shift is produced in the windings 15 of magnet 5. This polarity shift is produced as the rise on cam 85 acts on cam follower 86 to move the contact pairs 75 into the opposed set of stationary switch contacts in switch 65. The magnet 5 maintains this reversed polarity throughout the first 135° of cam rotation.

The next change to occur is in magnet 7, and this change is produced by the cam 87 acting on switch 67. This may be of short duration, but is is possible to have it occur throughout the period ranging from 45° to 90° of cam rotation. At 90° of cam rotation, the switch 67 is restored to its normal illustrated position, causing magnet 7 to repel magnet 6 and drive the assembly toward the left. Next, the polarity of magnet 5 is changed at 135° of cam rotation so that magnet 5 repels magnet 4. When the magnet 4 arrives at the position of FIG. 3e, there has been a cam rotation of 180°, whereupon the polarity of magnet 3 is changed, causing mutual attraction between the magnets 2, 3 and 4. Next, the polarity of magnet 1 is changed by switch 61 operating under the influence of cam 81. This draws the magnets 2,3 and 4 to their furthest left position at about 225° of cam rotation. At 270° of cam rotation, the polarity of magnet 1 is returned or restored to its initial condition, repelling the group of magnets 2, 3 and 4, driving them to the right as shown in FIG. 3h. Subsequently, the polarity of magnet 3 is changed as the cam follower of switch 63 falls from the rise on the cam 83 at the final part of cam rotation.

The apparatus of FIGS. 1-4 will not deliver a constant force throughout the stroke of the device. This is because, for adjacent magnets separated by a given air gap, the force produced by magnetic attraction is greater than the force produced by magnetic repulsion. Therefore, the output force delivered at the times illustrated in FIGS. 3b, 3c, 3f and 3g is greater than the force produced during the remaining parts of the apparatus cycle.

In order to avoid or reduce fluctuations in the force delivered by the apparatus, it is possible to place a pair of devices such as shown in FIGS. 1-4 in tandem so that one device would be producing magnetic repelling forces at the same time the other device produces magnetic attracting forces. The second assembly would, in effect, be a mirror image of the illustrated assembly, and it may have its driven magnet connected to the same shaft.

Another possible arrangement for equalizing the force delivered throughout the stroke is shown in FIGS. 5 and 6 where it will be seen that there are three relatively-fixed magnets 100, 101 and 102. Moving magnets 103, 104, 105 and 106 are placed between the magnets 100 and 101; and, movable magnets 107, 108, 109 and 110 are placed between the stationary magnets 101 and 102. All magnets 100–110 may be constructed in any of the manners illustrated in FIGS. 2 and 9–16. Each magnet is provided with a pair of holes for receiving the nonmagnetic output shafts 96 and 98 which serve both to deliver the output force and to guide the magnets for their relative movement. The magnets 106 and 107 are the driven magnets which are longitudinally fixed to the output of shafts 96 and 98, but the remaining magnets have apertures for slidably receiving the shafts 96 and 98.

Usual operation of the apparatus of FIG. 5 will entail one set of movable magnets acting in a repelling mode as the other set of movable magnets is acting in an attracting mode. This will be understood by referring to FIG. 5 which shows the set of magnets 103–106 stacked against the stationary magnet 100, and the movable magnets 107–110 being equally spaced between the magnets 101 and 102. In this assembly, the shafts 96 and 98 will be driven to the right during a first stage of movement created by causing magnetic repulsive forces between the magnets 105 and 106, while at the same time creating attracting forces between the magnets 107 and 108. Magnets 106 and 107, being attached to the shafts 96 and 98, will drive the shafts 96 and 98 to the right. The second stage of movement will occur as the magnets 104 and 105 are placed in a repelling condition and the magnets 108 and 109 are made to be mutually attracting. Then, magnets 103 and 104 are made to repel each other as magnets 109 and 110 become mutually attracting. The final stage of movement of the shafts 96 and 98 to the right occurs when magnet 103 becomes repulsive of magnet 100 and the magnet 110 becomes attractive of the magnet 102. At that point, the device will appear as shown in FIG. 6, whereupon a reverse action occurs, again sequentially changing polarities so that the magnets are driven to the left, to the position illustrated in FIG. 6. It will be understood that during the repelling phase of operations, the motion-limiting means prevents the magnets from repelling each other to a point where there would be an excessive air gap which would prevent subsequent attraction of its adjacent magnet when polarities are changed.

Although it is strongly preferred to use simultaneous attracting and repelling forces in the system of FIGS. 5 and 6, this system would be operable merely by using repelling forces in one section of the device and then using repelling forces in the other section of the device. Likewise, only attracting forces might be used to create a substantially constant output force throughout the operation of the device.

The apparatus diagramatically illustrated in FIG. 7 and 8 is similar to that of FIGS. 5 and 6 in the respect that it has three stationary magnets 100′, 101′ and 102′ which are of unchanging polarities. In the embodiment of FIGS. 7 and 8, there is an odd number of movable magnets between each pair of stationary magnets, but the driven magnets 106′ and 107′ which are longitudinally fixed on the output shaft 96′ move substantially against the central stationary magnet 101′. Toward the end of the stroke, this utilizes both the repulsive forces with respect to the adjacent movable magnets and the attractive force with respect to the stationary central magnet 101′. If desired, the additional force so produced toward the end of the stroke may be stored by providing spring washers diagramatically shown at 111′. The compression of these springs serves to store potential energy which is released when the output shaft 96′ commences its stroke in the opposite direction. This will also permit the apparatus to operate at a higher speed. Apart from these features, the apparatus of FIGS. 7 and 8 operate substantially as that of FIGS. 6 and 7, although the utilization of an odd number of movable magnets in each set makes it possible to have certain magnets such as 105′ and 108′ of unchanging polarity throughout the utilization of the apparatus. Of course, additional sets of magnets may be added to the apparatus of FIGS. 7 and 8, each set including a single stationary magnet and three movable magnets aligned along the shaft 96′ in the same manner as the two sets shown.

Alternative magnet constructions are illustrated in FIGS. 9–16. A plurality of any of these magnets may be substituted for the magnets 1–7 shown in FIGS. 1 and 2.

The magnet 120 of FIG. 9 has a core 122 formed of a plurality of E-shaped laminations of ferromagnetic material selected for its superior magnetic properties. A rearwardly-facing stack 124 of such laminations is placed back-to-back with an identical forwardly-facing stack 126. Windings 128 are wrapped around the back-to-back vertical legs of the stacks to produce one polarity at the pole faces 130 and the opposite polarity at the pole faces 132. Preferably, the area of pole face 130 is equal to the total area of the two pole faces 132 so that the magnetic flux may be equal throughout the core. It would be equally suited to form this magnet on a core formed of integral laminations which each have the configuration of the back-to-back E-shaped pieces.

The magnets of FIG. 9 may have their windings positioned around the intermediate horizontal legs 134 rather than around the vertical leg as illustrated. This alternative structure, however, is less desirable as it requires twice the electrical input to achieve the same magnetic pull.

When placed in apparatus of the type shown in FIG. 1, the magnets of FIG. 9 are mounted for reciprocating movement in the direction shown by the arrow 136, which lies parallel to the axis A—A of FIG. 1.

The magnet shown in FIGS. 10 and 11 are also suitable for substitution for the magnets 1–7 in FIG. 1. The magnet of FIGS. 10 and 11 resembles two back-to-back lifting magnets of the type used for handling scrap ferromagnetic materials. The core 138 is provided with oppositely facing central poles 140 of circular configuration surrounded by concentric annular pole faces 142, the annular space between the pole faces 140 and 142 being occupied by the circular windings 146 which are wound and energized in a manner so that both of the circular poles 140 will have one polarity and the annular poles 142 will be of the opposing polarity. Magnets constructed according to FIGS. 10 and 11 may be mounted in the apparatus of FIG. 1 in a manner which causes their movement in the direction indicated by the arrow 148 in FIG. 10, this movement being parallel to the axis A—A in FIG. 1.

Figure 12:
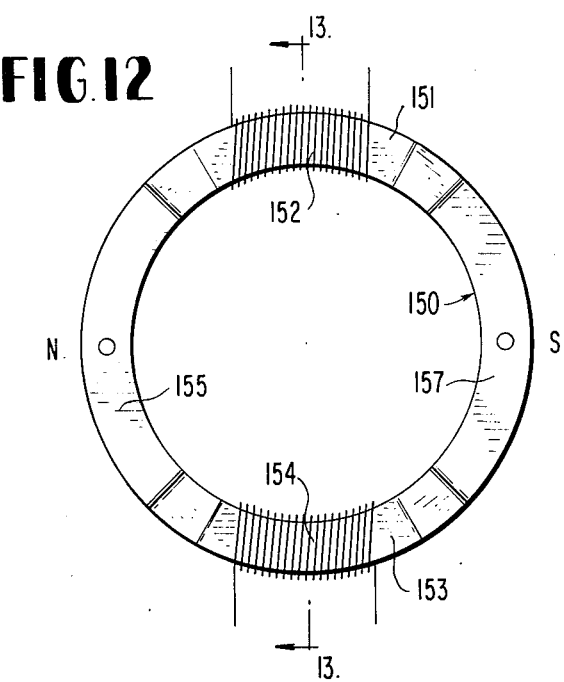
FIGS. 12 and 13 are sectional and facial views of a toroidal magnet which may be used in practicing the invention.
Figure 13:
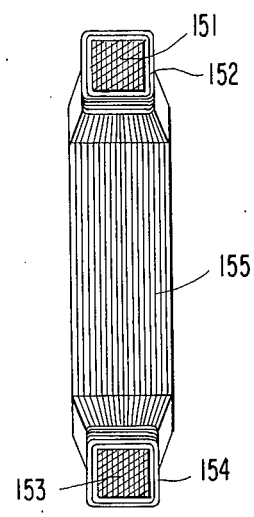

The magnet of FIGS. 12 and 13 has an annular core 150 formed of a plurality of flat annular laminations of a ferromagnetic composition selected for its superior magnetic properties. The core 150 may appropriately be of any other closed loop form, for example eliptical, square, triangular, etc. The core 150 has an axially thin area 151 provided with windings 152, and another axially thin area 153 provided with the windings 154. The core 150 also has axially thick areas 155 and 157, preferably created by placing spacers between the laminations. The exposed surfaces in the areas 155 and 157 are the pole faces which contact corresponding pole faces on the adjacent magnets. Of course, the advantage of having the thicker areas 155 and 157 is that the adjacent magnets may contact each other in these areas without producing any contact between their respective windings which are located on the thin areas 151 and 153.

In the arrangement of FIGS. 12 and 13, the windings 152 and 154 are energized in a manner so that the magnetic flux produced thereby is opposing, both windings tending to produce a flux of one polarity toward their left side and a magnetic flux of the opposite polarity toward their right side when viewed in the position shown in FIG. 12. This opposite polarity may be achieved by the direction in which the windings 152 and 154 are placed on the core, or by the direction in which the current flows through these windings. In either event, the axially-facing surfaces of the areas 155 and 157 provide the pole face, the core 150 being movable in a direction which is perpendicular to the drawing of FIG. 12 so that the axis about which the core 150 is generated is coincidental with the axis A—A of FIG. 1 along which the magnets are movable.

Figure 14:
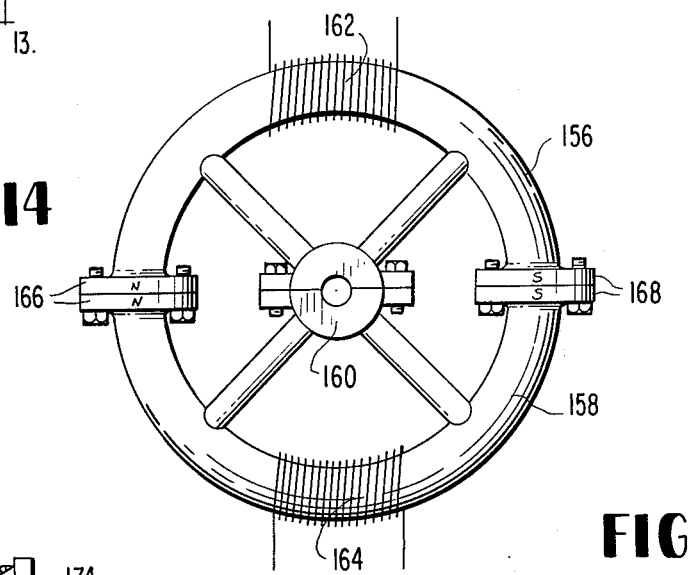
FIG. 14 is an elevational view of another suitable toroidal magnet.

The magnet of FIG. 14 operates in the same manner as described above in connection with FIGS. 12 and 13. The core in this instance, however, is formed of an upper half 156 and a lower half 158 which are held together by bolted flanges as shown. The magnetic path through the core may have a slight interruption by providing an air gap or placing a thin non-magnetic spacer between the flanges, and connecting the flanges with nonmagnetic bolts. A central hub 160 connected by spokes 161 to the halves 156 and 158 may be used to guide the core in its reciprocatory path, provided means are present to prevent the torus from rotating about the axis of the hub 160. The hub 160 and spokes 161 are of nonmagnetic material. As in the embodiment of FIGS. 12 and 13, the windings 162 and 164 are oriented or energized to produce opposed flux paths. The effect of this is to create one polarity at the poles formed by the axially-facing surfaces of the flanges 166 and an opposite polarity at the pole formed by the axially-facing surfaces of the flanges 168. In response to changes in polarity, the magnet of FIG. 14 will be caused to reciprocate in a direction which lies parallel to the central axis of hub 160, corresponding to the axis A—A in FIG. 1.

Figure 15:
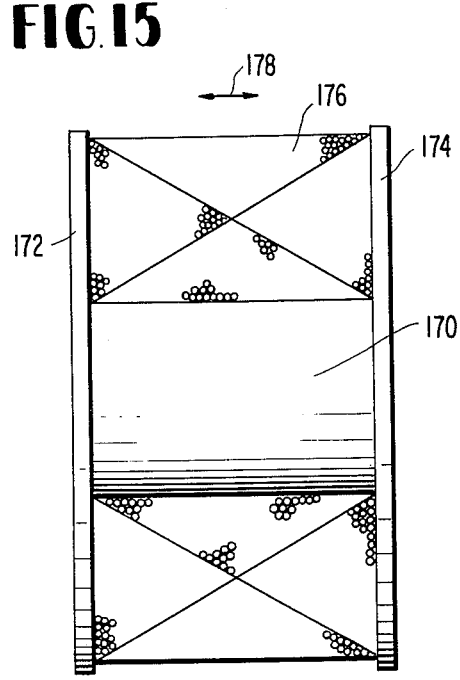
FIG. 15 shows a suitable spool type magnet.

The magnet shown in FIG. 15 is essentially a spool having a solid core 170 and end flanges 172 and 174 which contain the windings 176. Energization of the windings 176 will cause a magnetic flux to establish one polarity along the flange 172 and the opposite polarity along the flange 174. Changes in polarity created by a circuit such as illustrated in FIG. 4 will cause a plurality of the magnets shown in FIG. 15 to move in the direction of arrow 178 which is parallel to the axis A—A in FIG. 1.

Figure 16:
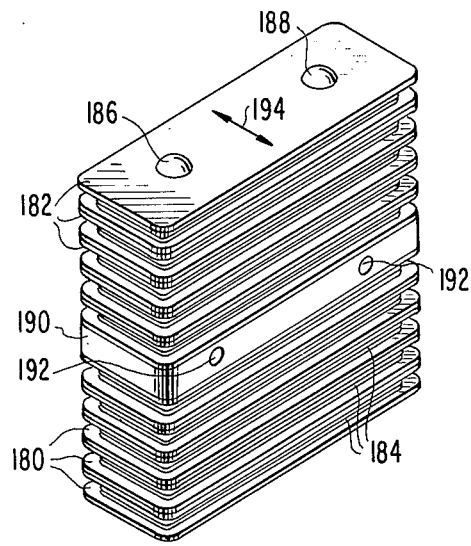
FIG. 16 shows a magnet wound on stacked plates.

Another type of magnet suitable for use in connection with the invention is shown in FIG. 16 where the magnet is made of a stack of sandwich-like elements, each element having a central plate (not shown) with faces which bear against face plates 180 and 182 which have larger peripheral dimensions than the central plate. The windings 184 are wrapped around the central plate in the area bounded by the peripheral portions of the face plates 180 and 182. A stack of such magnets is assembled and held together by rivets 186 and 188, the center of the stack being provided with a mounting plate 190 provided with guide holes 192. When this magnet is substituted for the magnets 1–7 in the FIG. 1 apparatus, the guide rods 19 and 20 are received by the apertures 192 so that the magnet of FIG. 16 will move in the direction indicated by the arrow 194, parallel to the axis A—A in FIG. 1.

The electrical current through the windings of each sandwich unit in the FIG. 16 magnet is preferably opposite to the current through the adjacent sandwich unit so that at the face-to-face juncture of adjacent sandwich units, there will be opposite polarities presented. This has been found to provide substantial magnetic attraction and repulsion along the edges of the plates 180 and 182 which together provide the pole face for the magnet of FIG. 16.

Of course, there are many changes which may be made to the preferred arrangement without departing from the invention. A smaller or larger number of magnets may be used. Several magnets may have their polarities changed simultaneously rather than singly in cam-determined sequence. Magnets 2, 4 and 6 which do not undergo a polarity change may be permanent magnets. Changes in polarity may be accomplished in response to arrival of magnets at their positions rather than in the timed sequence which depends on the angular velocity of the cam. For example, the polarity of magnet 7 may be changed by a switch which is actuated by the arrival of magnet 5 at the position shown in FIG. 3b. One of the end magnets may be movable and connected to an output means, provided that there is a corresponding sequence of polarity changes within the apparatus; however, this would not be a preferred embodiment of the invention. There are also many types of output means which may be used coupled mechanically, electromagnetically or otherwise to the apparatus of this invention. The invention may be used to drive linear electrical generators or to connect various types of mechanical linkages. For an example of the latter, it is believed suitable to use the present invention in connecting together the pumps with the actuating magnets illustrated and described in my U.S. Pat. No. 3,992,132 which is incorporated herein by reference.

In view of the many possible modifications and improvements to the inventive concept disclosed herein, it is emphasized that the invention is not limited only to the described embodiments but is intended to encompass other forms therein which fall within the spirit of the following claims.

I claim:

1. Apparatus for producing movement, comprising
   a plurality of magnets,
   means for supporting said magnets for relative movement along an axis with pairs of adjacent said magnets being movable from mutually proximate relative positions to mutually distant relative positions where the distance between them is increased by a given distance, at least two of said magnets being movable both relative to each other and relative to a third said magnet,
   means for changing the polarity of one of each adjacent pair of magnets to move the adjacent magnets between their mutually proximate relative positions and their mutually distant relative positions,
   one of said magnets being a driven magnet which is movable along said axis through a distance which is equal to the total of said given distances, and
   output means connected to said driven magnet.

2. The apparatus of claim 1 wherein said output means is an hydraulic pump.

3. The apparatus of claim 1 in combination with a second said apparatus which is also connected to said output means, said means for changing the polarity in one of said apparatus moving its associated magnets to their mutually distant positions as the means for changing the polarity in the other said apparatus moves its associated magnets to their mutually proximate relative positions.

4. The apparatus of claim 1 wherein said magnets include an end magnet and an intermediate magnet which is located between the end magnet and the driven magnet,
stop means for limiting the extent of movement of the intermediate magnet in a direction away from said end magnet to establish the thickness of the air gap between the driven magnet and the intermediate magnet when they are in their mutually distant relative position.

5. The apparatus of claim 4 in combination with a second said apparatus which is also connected to said output means, said means for changing the polarity in one said apparatus moving its associated magnets to their mutually distant positions as the means for changing the polarity in the other said apparatus moves its associated magnets to their mutually proximate relative positions.

6. The apparatus of claim 1 wherein said magnets include two end magnets, a plurality of intermediate magnets and said driven magnet,
said end magnets lying at opposite ends of the apparatus and being spaced apart by a constant distance,
said driven magnet being movable toward both of said end magnets from a central position midway between the end magnets,
said intermediate magnets being located between said end magnets and the central magnet, said means for changing the polarity being operable on said intermediate magnets, and
stop means for limiting the movement of the intermediate magnets toward said central position to establish the thickness of the air gaps between adajcent magnets when in their mutually distant relative positions.

7. The apparatus of claim 6 wherein said output means is an hydraulic pump.

8. The apparatus of claim 6 in combination with a second said apparatus which is also connected to said output means, said means for changing the polarity in one said apparatus moving its associated magnets to their mutually distant positions as the means for changing the polarity in the other said apparatus moving its associated magnets to their mutually proximate relative positions.

9. The apparatus of claim 1 having two stationary end magnets, a stationary intermediate magnet located between said end magnets, sets of at least three longitudinally movable magnets, one said set being located between each pair of said stationary magnets, each set including a said driven magnet connected to said input means, said driven magnets being the magnets adjacent to said stationary intermediate magnet.

10. The apparatus of claim 9 wherein said means for changing the polarity changes the polarity of the driven magnets.

11. The apparatus of claim 9 wherein the stationary magnets have the same polarity and each set of movable magnets includes an odd number of magnets.

12. The apparatus of claim 11 wherein said means for changing the polarity changes the polarity of the movable magnets which are the magnets adjacent to the stationary magnets.

13. The apparatus of claim 1 wherein each of said magnets includes a core and two spaced-apart windings,
said core being a loop oriented perpendicular to said axis,
one of said windings on said core being energized to provide a magnetic flux directed in the core in a given direction,
the other of said windings on said core being energized to provide a magnetic flux in the core directed oppositely to said given direction.

14. Apparatus for producing movement, comprising a plurality of magnets,
means for supporting said magnets for relative movement along an axis with pairs of adjacent said magnets being movable from mutually proximate relative positions to mutually distant relative positions where the distance between them is increased by a given distance,
a first said magnet being a stationary magnet,
a second said magnet being a driven magnet and being movable along said axis with respect to said stationary magnet,
output means connected to said driven magnet,
a third said magnet being located at a position between said first magnet and said second magnet, said third magnet being movable along said axis with respect to said first magnet and with respect to said second magnet,
means operable at one time for changing the magnetic field of said magnet to move the second magnet toward said stationary magnet, and
means operable at a time different from said one time for changing the magnetic field of said third magnet to move said third magnet toward said first and second magnets.

15. The apparatus of claim 14 wherein each of said magnets includes a core and two spaced-apart windings,
said core being a loop oriented perpendicular to said axis,
one of said windings on said core being energized to provide a magnetic flux directed in the core in a given direction,
the other of said windings on said bore being energized to provide a magnetic flux in the core directed oppositely to said given direction.

* * * * *